(12) United States Patent
Jayakar (10) Patent No.: US 11,479,203 B2
(45) Date of Patent: Oct. 25, 2022

(54) ROOF-MOUNTED OCCUPANT RESTRAINT SYSTEM

(71) Applicant: ZF Passive Safety Systems US Inc., Washington, MI (US)

(72) Inventor: Hylus Ranjit Raj Jayakar, Shelby Township, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 17/044,407

(22) PCT Filed: Dec. 12, 2018

(86) PCT No.: PCT/US2018/065081
§ 371 (c)(1),
(2) Date: Oct. 1, 2020

(87) PCT Pub. No.: WO2019/209380
PCT Pub. Date: Oct. 31, 2019

(65) Prior Publication Data
US 2021/0114546 A1  Apr. 22, 2021

Related U.S. Application Data

(60) Provisional application No. 62/661,667, filed on Apr. 24, 2018.

(51) Int. Cl.
| | |
|---|---|
| *B60R 21/2338* | (2011.01) |
| *B60R 21/214* | (2011.01) |
| *B60R 21/232* | (2011.01) |
| *G01M 11/02* | (2006.01) |
| *G02B 3/00* | (2006.01) |
| *B60R 21/2342* | (2011.01) |

(Continued)

(52) U.S. Cl.
CPC ........ *B60R 21/2338* (2013.01); *B60R 21/214* (2013.01); *B60R 21/232* (2013.01);
(Continued)

(58) Field of Classification Search
CPC . B60R 21/214; B60R 21/232; B60R 21/2338; B60R 2021/23107;
(Continued)

(56) References Cited

U.S. PATENT DOCUMENTS

| | | |
|---|---|---|
| 2,834,606 A | 5/1958 | Bertrand |
| 3,779,577 A | 12/1973 | Wilfert |

(Continued)

FOREIGN PATENT DOCUMENTS

WO     03059700     7/2003

*Primary Examiner* — Laura Freedman
(74) *Attorney, Agent, or Firm* — Tarolli, Sundheim, Covell & Tummino LLP (57) ABSTRACT

A restraint system (10) for helping to protect an occupant (60) of a vehicle (20) having a seat (50) for the occupant (60) includes a primary airbag (70) having a stored condition within the roof (32) and being inflatable to a deployed condition extending into the cabin (40) on a first side of the seat (50). A support airbag (76) has a stored condition within the roof (32) and is inflatable to a deployed condition on a second side of the seat (50) opposite the first side. Tethers (120) connect the primary airbag (70) and the support airbag (76) such that occupant (60) penetration into the primary airbag (70) pulls the support airbag (76) into engagement with the seat (50).

19 Claims, 6 Drawing Sheets

(51) Int. Cl.
  *B60R 21/00*  (2006.01)
  *B60R 21/231*  (2011.01)
(52) U.S. Cl.
  CPC ........... *G01M 11/0257* (2013.01); *G02B 3/00* (2013.01); *B60R 21/2342* (2013.01); *B60R 2021/0004* (2013.01); *B60R 2021/23107* (2013.01); *B60R 2021/23161* (2013.01); *B60R 2021/23382* (2013.01); *B60R 2021/23386* (2013.01)
(58) Field of Classification Search
  CPC ........... B60R 2021/23153; B60R 2021/23161; B60R 2021/23192; B60R 2021/23386
  See application file for complete search history.

(56) References Cited

U.S. PATENT DOCUMENTS

| | | | |
|---|---|---|---|
| 3,795,412 A | 3/1974 | John | |
| 10,023,146 B2 * | 7/2018 | Faruque | ............... B60R 21/233 |
| 10,112,570 B2 * | 10/2018 | Barbat | ................... B60N 2/143 |
| 10,471,923 B2 * | 11/2019 | Jimenez | .............. B60R 21/2338 |
| 10,807,556 B2 * | 10/2020 | Hill | ....................... B60R 21/232 |
| 11,135,992 B2 * | 10/2021 | Faruque | ................ B60R 21/217 |
| 11,192,515 B2 * | 12/2021 | Jayakar | ................. B60R 21/214 |
| 2009/0033081 A1 | 2/2009 | Fischer et al. | |
| 2009/0039625 A1 | 2/2009 | Breed | |
| 2009/0295131 A1 | 12/2009 | Kim | |
| 2010/0140909 A1 | 6/2010 | Jang | |
| 2010/0301591 A1 | 12/2010 | Kwon et al. | |
| 2011/0140401 A1 | 6/2011 | Fischer et al. | |
| 2012/0267883 A1 | 10/2012 | Fischer et al. | |
| 2014/0232092 A1 | 8/2014 | Lenorcy et al. | |
| 2015/0274115 A1 | 10/2015 | Fischer et al. | |
| 2016/0311393 A1 | 10/2016 | Smith et al. | |
| 2016/0347272 A1 | 12/2016 | Kato et al. | |
| 2017/0225641 A1 | 8/2017 | Faruque et al. | |
| 2018/0222432 A1 | 8/2018 | Schneider | |
| 2019/0161048 A1 | 5/2019 | Thomas et al. | |
| 2019/0161049 A1 | 5/2019 | Thomas et al. | |

* cited by examiner

ROOF-MOUNTED OCCUPANT RESTRAINT SYSTEM

CROSS REFERENCE TO RELATED APPLICATIONS

This application is a national stage of International Application No. PCT/US2018/065081, filed Dec. 12, 2018, which claims benefit of U.S. Provisional Appln. No. 62/661,667 filed Apr. 24, 2018. The disclosures of these applications are incorporated herein by reference in their entireties.

TECHNICAL FIELD

The present invention relates generally to vehicle airbags and, in particular, relates to a roof-mounted primary airbag with a support airbag.

BACKGROUND

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle. Such airbags may be driver airbags or passenger airbags. When inflated, the driver and passenger airbags help protect the occupant from impacts with parts of the vehicle such as the instrument panel and/or a steering wheel of the vehicle.

Passenger airbags are typically stored in a deflated condition in a housing that is mounted to the vehicle instrument panel. An airbag door is connectable with the housing and/or instrument panel to help enclose and conceal the airbag in a stored condition. Upon deployment of the passenger airbag, the airbag door opens to permit the airbag to move to an inflated condition. The airbag door opens as a result of forces exerted on the door by the inflating airbag.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated condition. The airbag cover opens as a result of forces exerted on the cover by the inflating driver airbag.

There are trends in the auto industry to make vehicles more spacious. Styling has been making the instrument panel smaller and thus farther away from the occupant. Looking further into the future, driverless, autonomous vehicles are even more spacious. Autonomous vehicles have been contemplated for some time, and now their adaption on a large scale is approaching. Autonomous vehicles can eliminate some of the structure.

With these realities as a backdrop, the paradigm of occupant safety systems must shift. In the past, the necessity of a vehicle operator/driver lent to a somewhat standard vehicle passenger cabin configuration. In the U.S., the driver is a front seat, left side, forward facing occupant within reach of the vehicle controls and instrumentation (steering wheel, pedals, instrument panel, console, etc.). This driver configuration helps dictate the layout of the remainder of the vehicle—front seat, forward-facing passenger-side occupant, rear seat (second row, third row, etc.) forward-facing occupants. Accordingly, in the past, occupant safety systems were typically designed with this passenger cabin layout and the associated occupant positions and orientations in mind.

The autonomous vehicle eliminates the operator/driver, which eliminates the necessity of their being positioned and oriented in the conventional manner. Vehicle manufacturers are free to utilize passenger cabin space as they see fit without being constrained to predetermined passenger arrangements, such as all forward-facing occupants, or vehicle structural configurations, such as steering wheel/instrument panel configurations, center console configurations, foot well pedal controls, etc.

This presents the challenge of not only where to locate airbag systems, but also finding a reaction surface against which to position the airbag so that it can absorb impacts. Typically, instrument panel and steering wheel mounted frontal airbags utilize those structures as a reaction surface against which the airbag rests so that it can oppose, cushion, and absorb the impact energy of an impacting occupant and provide a desired ride-down effect. In the autonomous vehicles, however, the vehicle may not have an instrument panel or steering wheel at all, and the occupants can be positioned and oriented outside the traditional manner. This can make it difficult or impossible to utilize traditional structures in the vehicle as reaction surface.

SUMMARY

In one example, a restraint system for helping to protect an occupant of a vehicle having a roof and a cabin with a seat for the occupant includes a primary airbag having a stored condition within the roof and being inflatable to a deployed condition extending into the cabin on a first side of the seat. A support airbag has a stored condition within the roof and is inflatable to a deployed condition on a second side of the seat opposite the first side. Tethers connect the primary airbag and the support airbag such that occupant penetration into the primary airbag pulls the support airbag into engagement with the seat.

In another example, a restraint system for helping to protect an occupant of a vehicle having a roof and a cabin with a seat for the occupant includes a primary airbag having a stored condition within the roof and being inflatable to a deployed condition extending into the cabin on a first side of the seat. A support airbag has a stored condition within the roof and is inflatable to a deployed condition on a second side of the seat opposite the first side. A first inflator provides inflation fluid to the primary airbag. A second inflator provides inflation fluid to the support airbag. Tethers connect the primary airbag and the support airbag such that occupant penetration into the primary airbag pulls the support airbag into engagement with a seatback of the seat to restrict movement of the primary airbag away from the occupant.

Other objects and advantages and a fuller understanding of the invention will be had from the following detailed description and the accompanying drawings.

DETAILED DESCRIPTION

Figure 1:
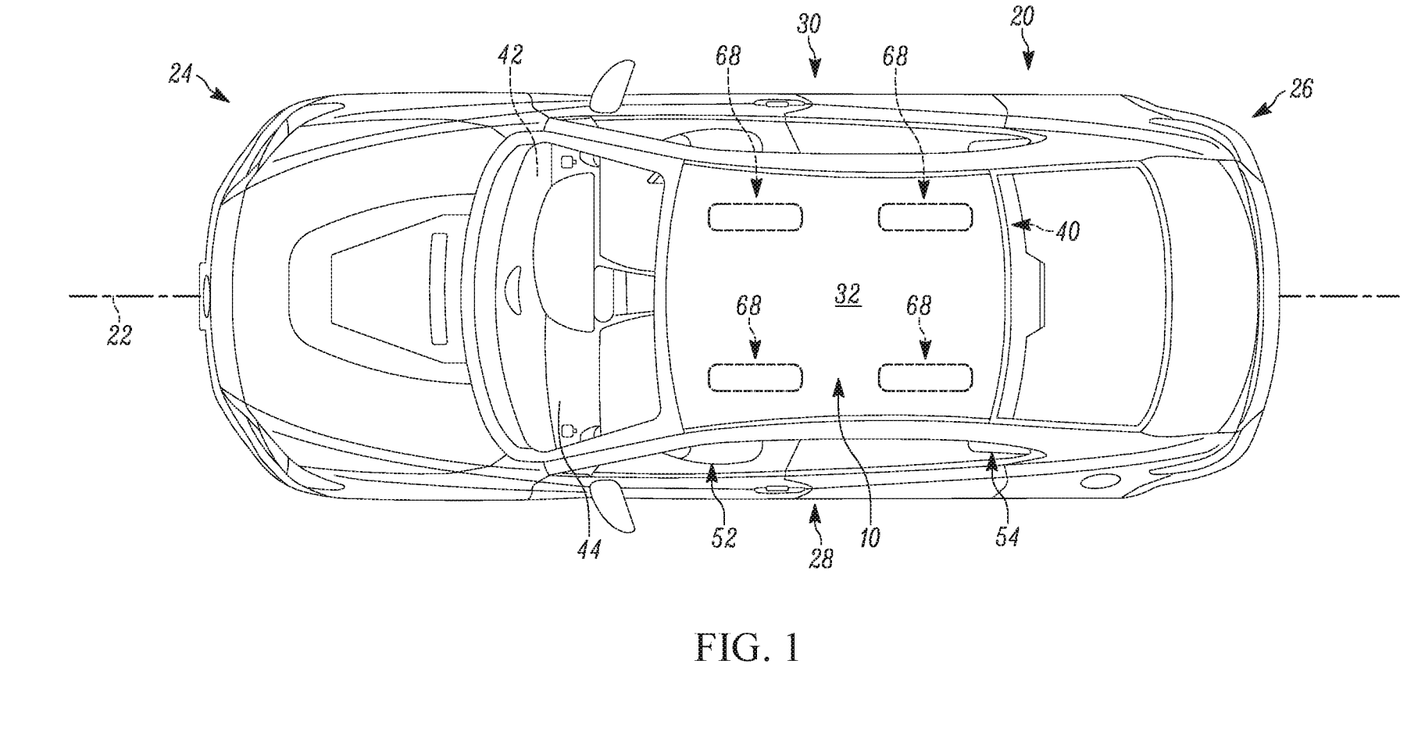
FIG. 1 is a top view of a vehicle including an example roof-mounted, occupant restraint system.
Figure 2:
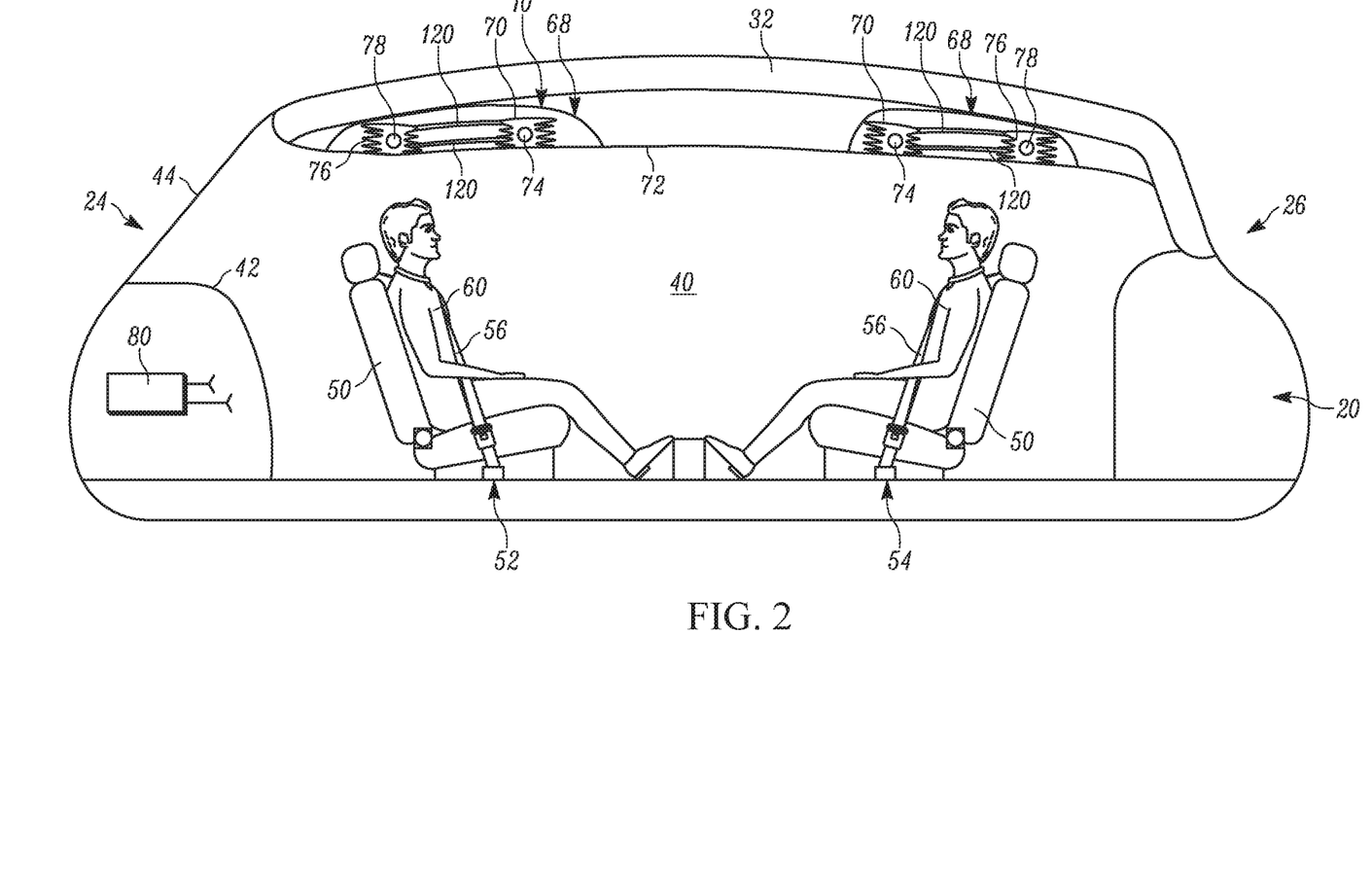
FIG. 2 is a schematic illustration of a cabin of the vehicle with airbags of the restraint system in a stored condition.

The present invention relates generally to vehicle airbags and, in particular, relates to a roof-mounted primary airbag with a support airbag. FIGS. 1-2 illustrate an example vehicle safety system in the form of an occupant restraint system 10. The vehicle 20 extends along a centerline 22 from a first or fore end 24 to a second or aft end 26. The vehicle 20 extends to a left side 28 and a right side 30 on opposite sides of the centerline 22. The first end 24 of the vehicle 20 includes an instrument panel 42 facing a passenger compartment or cabin 40. A windshield or windscreen 44 can be located between the instrument panel 42 and the roof 32.

The vehicle 20 can be an autonomous vehicle, in which case the cabin 40 can be without operator controls, such as a steering wheel, pedals, instrumentation, center console, etc. Accordingly, the instrument panel 42 can be reduced in size or removed altogether in order to maximize the space in the cabin 40.

Seats 50 are positioned in the cabin 40. In this open passenger cabin 40 configuration, the vehicle seats 50 can be configured, positioned, and arranged in a variety of manners, not constrained by the need to facilitate a vehicle driver/operator. For example, in FIG. 2, the seats 50 can be arranged in front and rear rows 52 and 54, respectively, facing each other, with the front row facing rearward toward the rear row. Alternatively, the front and rear rows 52 and 54 can both be arranged in a forward-facing manner (not shown), similar to that of conventional automobiles. In either case, each seat 50 includes a seatback 51 and is fitted with a seatbelt 56 for restraining its occupant 60. The occupant 60 faces away from the seatback 51. Control interfaces for climate controls, GPS, navigation, entertainment, etc. can, for example, be provided in a center console area of the vehicle 20 located between the occupants 60 of the front and/or rear rows 52, 54.

For the unconventional, forward-rearward seating arrangement of FIG. 2, in the event of a frontal crash, the occupants 60 of the forward-facing rear row 54 are restrained by their respective seatbelts 56. Occupants 60 of the rear-facing front row 52, while buckled, are supported in a frontal crash by the seatbacks of the vehicle seats 50. Because of this, the seats 50 must be constructed to support the occupants 60 in the event of a crash. For the forward-facing occupants 60 in the rear row 54, the seatbelts 56 offer some degree of restraint. It is desirable, however, for both rows 52, 54 to include additional restraints for head and neck support.

Since the front row 52 need not face forward and need not be in close proximity to the instrument panel 42 or the area where an instrument panel would normally reside, there can be a large volume of space between the front row 52 and the forward cabin structure presented facing the front row. Because of this, it may not be efficient to deploy airbags from this location due to the large volume that the airbags would need to occupy. This would present problems in sizing the airbag(s) and inflator(s) to occupy that large volume, and could also present problems in deploying the airbag(s) into that large volume in the necessary short time required to protect the occupants in a crash scenario.

It is therefore evident that the various passenger seating configurations enabled by autonomous vehicles can present challenges to the conventional concepts of airbag protection. Furthermore, since airbags require structure supporting the deployed airbag against movement in response to occupant penetration (e.g., a reaction surface), the absence of typical vehicle architecture that acts as a reaction surface, such as an instrument panel, presents additional challenges.

With this in mind, the occupant restraint system 10 shown in FIGS. 1-2 includes at least one airbag module 68 for placement along the roof 32 of the vehicle 20. Each airbag module 68 includes a vehicle occupant protection device in the form of a primary inflatable curtain airbag 70, an inflatable support airbag 76, and inflators 74, 78 for providing inflation fluid to the primary and support airbags, respectively. Alternatively, the primary airbag 70 and inflator 74 can be provided in a separate airbag module 68 from the support airbag 76 and inflator 78 (not shown).

Mounting the airbag modules 68 in the vehicle roof 32 is convenient because the primary airbags 70 can be positioned in locations with a desired proximity to the occupants 60 they are intended to help protect. This can help reduce the necessary inflatable volume of the primary airbags 70 and can also help provide a desired airbag deployment time without requiring an excessively high-volume inflator. The airbag modules 68 are housed/concealed in the roof structure of the vehicle 20 behind, for example, a roof liner 72. The airbags 70, 76 are at least one of rolled and folded before being placed in the airbag module 68 behind the roof liner 72.

The inflators 74, 78 are operatively connected (e.g., by wires) to an airbag controller 80 (see FIG. 2) that includes or communicates with one or more crash sensors (not shown). The airbag controller 80 is operative to determine the occurrence of a crash event and to actuate the inflators 74, 78 in a known manner to inflate the airbags 70, 76. The inflators 74, 78 can be of any known type, such as stored gas, solid propellant, augmented or hybrid. Regardless, the inflator 74 supplies inflation fluid to the primary airbag 70. The inflator 78 supplies inflation fluid to the support airbag 76. Alternatively, a single inflator can supply inflation fluid to both airbags 70, 76 (not shown).

The airbags 70, 76 can be constructed of any suitable material, such as nylon (e.g., woven nylon 6-6 yarns), and may be constructed in any suitable manner. For example, the primary airbag 70 may include one or more pieces or panels of material. If more than one piece or panel is used, the pieces or panels can be interconnected by known means, such as stitching, ultrasonic welding, heat bonding, or adhesives, to form the airbags 70, 76. The airbags 70, 76 can be uncoated, coated with a material, such as a gas impermeable urethane, or laminated with a material, such as a gas impermeable film. The airbags 70, 76 can therefore have a gas-tight or substantially gas-tight construction. Those skilled in the art will appreciate that alternative materials, such as polyester yarn, and alternative coatings, such as silicone, may also be used to construct the airbags 70, 76.

The occupant restraint system 10 can include multiple airbag modules 68 provided along the roof 32 and within the roof liner 72 at locations associated and aligned with each seat 50 in each row 52, 54. In other words, each seat 50 in the vehicle 20 can have an individual airbag module 68 associated therewith and, thus, each seat can have individual airbags 70, 76 (and corresponding inflators 74, 78) associated and aligned therewith. In each case, the primary airbag 70 is aligned with and positioned in front of the associated seat 50 in each row 52, 54 in the direction the occupants 60 in those seats would face (i.e., rearward of the front row 52 and forward of the rear row 54). The associated support airbag 76 is aligned with and positioned behind the associated seat 50 such that the seat and occupant 60 therein are positioned between the primary airbag 70 and the support airbag for each row 52, 54.

The primary airbags 70 extend in the left-to-right direction of the vehicle 20 generally parallel to the width of the seats 50. Alternatively, a single primary airbag 70 can span the entire width of the cabin 40 to protect all the occupants 60 in an entire row 52 or 54 (not shown). In the example shown in FIG. 2, the airbag modules 68 are provided behind the roof liner 72 and associated with each seat 50 in each row 52, 54. The airbag modules 68 are identical and, thus, the construction and operation of only the airbag module associated with one seat 50 in each row 52, 54 is discussed for brevity.

Figure 3:
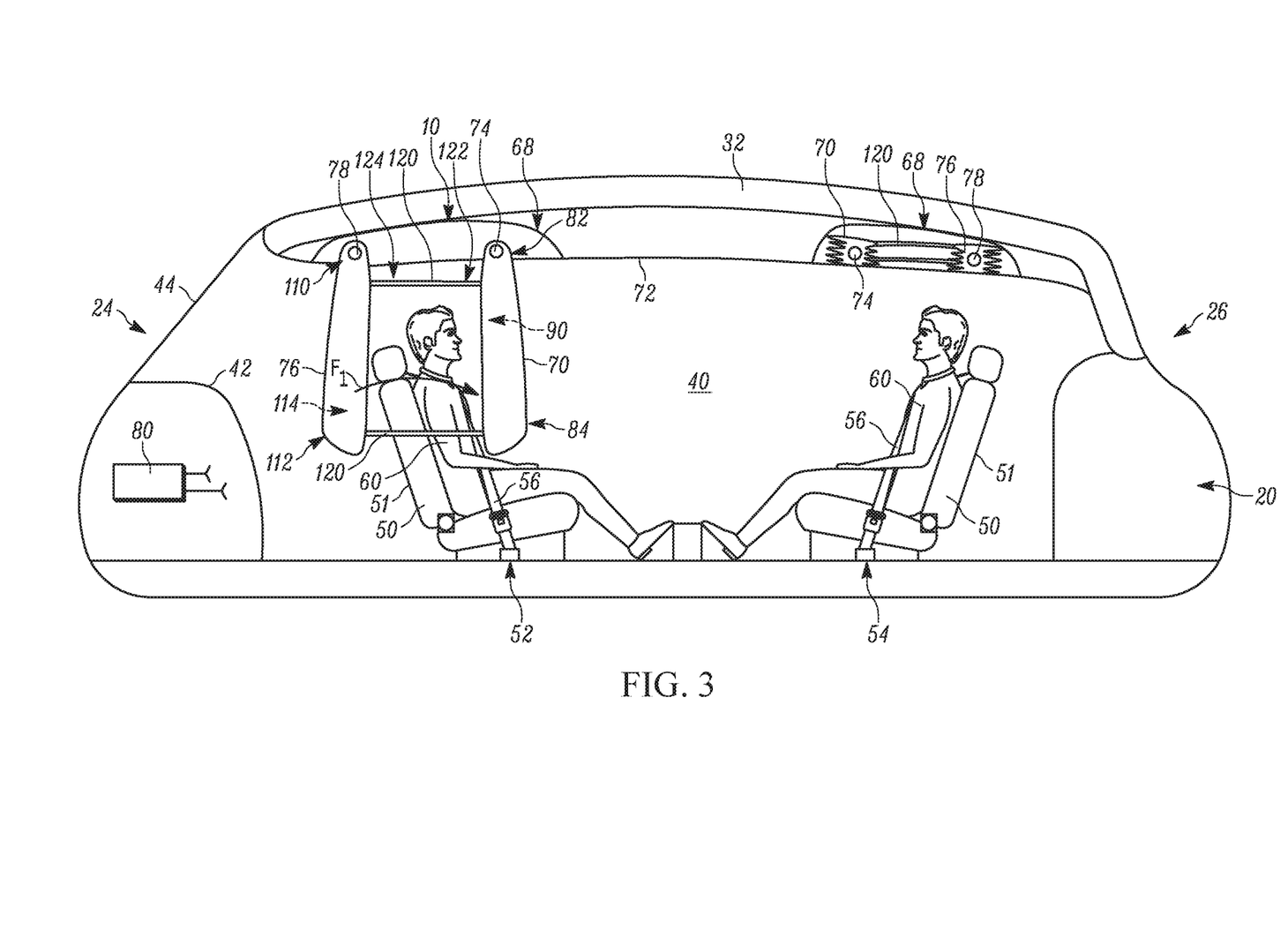
FIG. 3 is a schematic illustration of the cabin of the vehicle with the airbags in a deployed condition following a rear vehicle impact.

As shown in FIG. 3, upon sensing the occurrence of an event for which inflation of the primary airbag 70 is desired, such as a rear vehicle collision, the controller 80 provides signals to the inflators 74, 78 in the airbag module 68 associated with the front row 52. Upon receiving the signals from the controller 80, the inflators 74, 78 are actuated and provide inflation fluid to the inflatable volumes of the airbags 70, 76 in a known manner. The inflating airbags 70, 76 exert a force on the roof liner 72, which causes the roof liner to open (e.g., via tear seam or door). This releases the airbags 70, 76 to inflate and deploy from stored conditions behind the roof liner 72 to deployed conditions extending into the cabin 40 on opposite sides of the seat 50 in the front row 52. The airbags 70, 76, while inflated, cooperate to help protect the occupant 60 in the front row 52 by absorbing the impact of the occupant.

The primary airbag 70, when deployed, extends from an upper end 82 to a lower end 84 and defines an inflatable volume 90. The upper end 82 is connected to the vehicle 20 and fluidly connected to the inflator 74. The lower end 84 is positioned adjacent an occupant 60 in the front row 52. The lower end 84 can engage the lap or lower torso of the occupant 60 (as shown) or be spaced therefrom (not shown).

The support airbag 76 extends from an upper end 110 to a lower end 112 and defines an inflatable volume 114. The upper end 110 is connected to the vehicle 20 and fluidly connected to the inflator 78. The lower end 112 extends into the cabin 40 to a position behind the seatback 51 and spaced therefrom (e.g., forward in the vehicle 20 from the seatback). The deployed airbags 70, 76 are aligned with one another on opposite sides of the seat 50 (e.g., aligned in a direction extending along or parallel to the centerline 22).

Tethers 120 connect the primary airbag 70 to the support airbag 76. To this end, each tether 120 includes a first end 122 secured to the primary airbag 70 and a second end 124 secured to the support airbag 76. The tethers 120 are secured to the airbags 70, 76 so as to extend in the fore-aft direction of the vehicle 20 on opposite sides of the seat 50. Each tether 120 is formed from a single piece of inextensible material. In one example, a first pair of tethers 120 extends between the upper ends 82, 110 of the airbags 70, 76 on opposite inboard-outboard sides of the occupant 60. A second set of tethers 120 extends between the lower ends 84, 112 of the airbags 70, 76 on opposite inboard-outboard sides of the occupant 60. Alternatively, the first set of tethers 120 can be omitted (not shown). The tethers 120 can be tensioned (as shown) or slacked (not shown) when the airbags 70, 76 are deployed but prior to occupant 60 penetration into the primary airbag 70.

As noted, the instrument panel and steering wheel are not in a position to act as a reaction surface to constrain movement of the deployed primary airbag 70. Due to the position of the airbags 70, 76 on opposite forward-rearward sides of the seat 50 and the tethers 120 connecting the airbags, the seatback 51 acts as a reaction surface to the deployed primary airbag. The example configuration shown in FIG. 3 therefore requires no interaction with forward structure of the vehicle 20, such as an instrument panel or steering wheel to provide a reaction surface for the primary airbag 70 in the event of a rear vehicle crash.

Because the occupant 60 is belted, a rear crash resulting in rearward occupant movement causes the occupant to bend at the waist and follow an angled or arcuate path toward the primary airbag 70, as indicated generally by the arrow $F_1$ in FIG. 3. Once the moving occupant 60 engages the primary airbag 70 (FIG. 4), the primary airbag is urged to move in the direction $F_1$.

Figure 4:
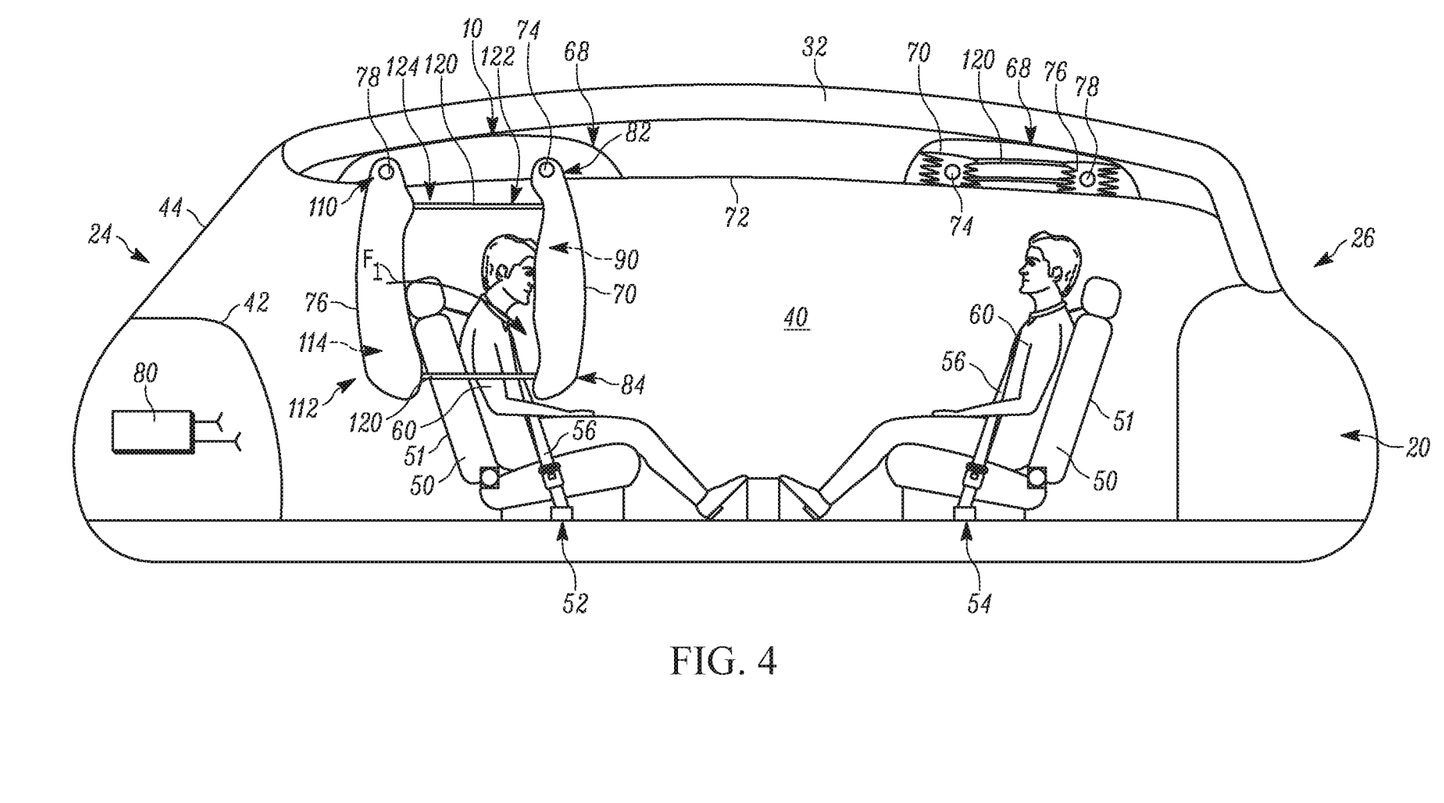
FIG. 4 is a schematic illustration of the cabin of the vehicle following occupant penetration into the deployed airbags following a rear vehicle impact.

Since the tethers 120 connect the support airbag 76 to the primary airbag 70, the moving primary airbag tensions the tethers and ultimately causes movement of the connected support airbag in the direction $F_1$. The support airbag 76 is pulled by the moving primary airbag 70 into engagement with the seatback 51, which prevents further movement of the support airbag in the direction $F_1$. This, in turn, prevents the primary airbag 70 from moving further in the direction $F_1$. In other words, the support airbag 76, through engagement with the seatback 51 and connection to the primary airbag 70 through the tethers 120, restricts movement of the primary airbag 70 away from the occupant 60.

Due to this configuration, the occupant 60 in a rear vehicle crash is permitted to ride down the primary airbag 70 and experience a more gradual reaction with the airbag while the support airbag 76, through the seatback 51 and tethers 120, provides a reaction surface for the deployed, moving primary airbag. In other words, this configuration advantageously allows for a gradual slowdown of the penetrating occupant 60 into the primary airbag 70 in a prescribed manner.

Figure 5:
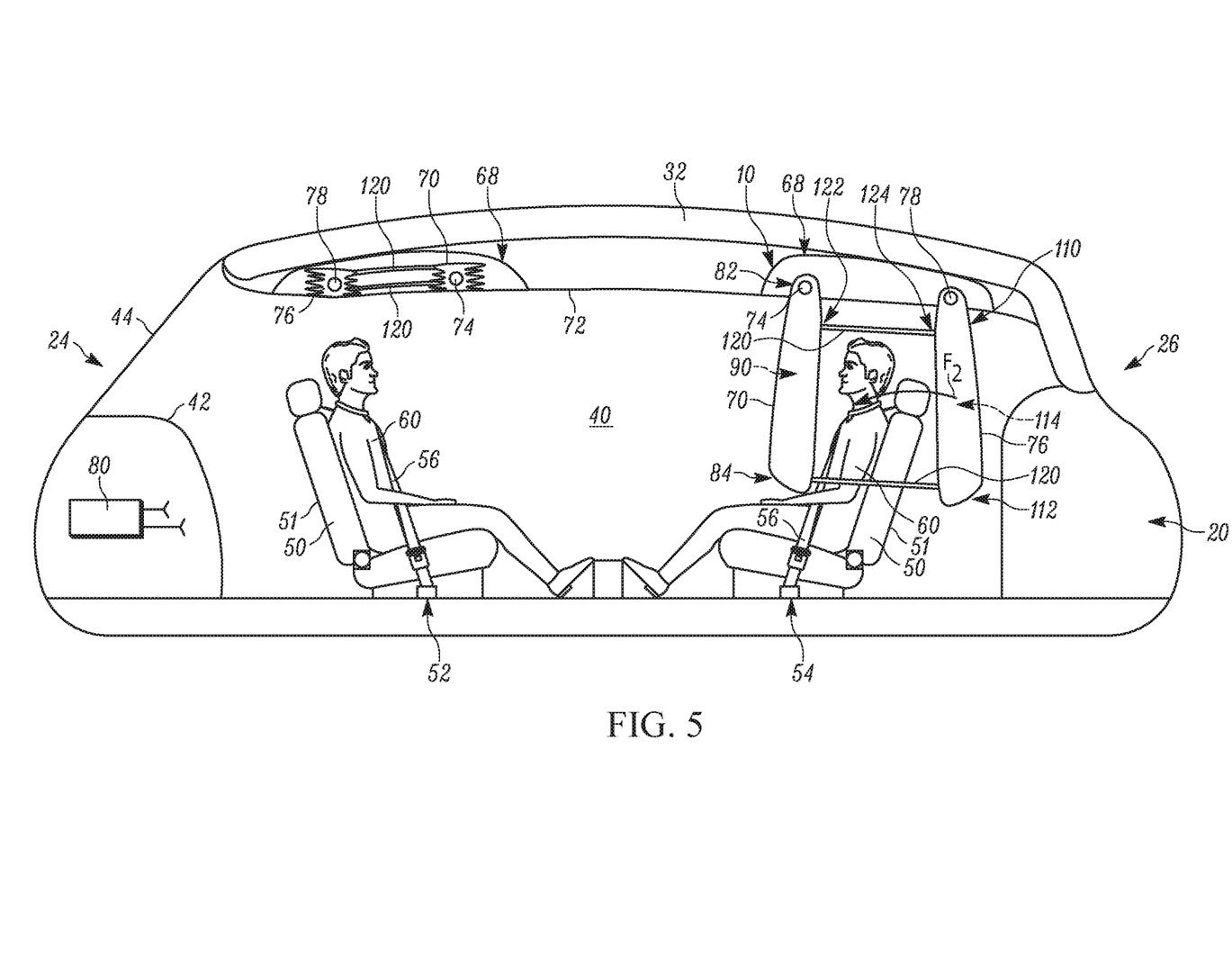
FIG. 5 is a schematic illustration of the cabin of the vehicle with the airbags in a deployed condition following a frontal vehicle impact.
Figure 6:
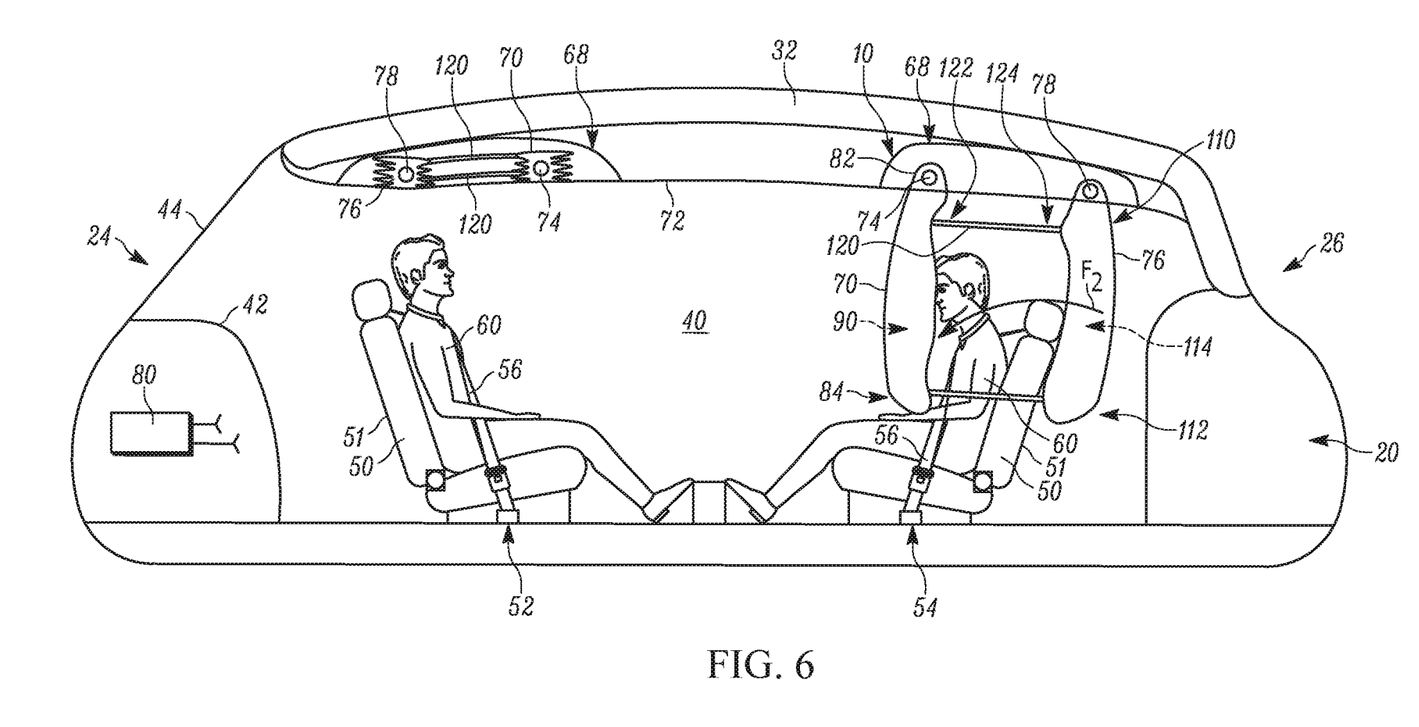
FIG. 6 is a schematic illustration of the cabin of the vehicle following occupant penetration into the deployed airbags following a frontal vehicle impact.

FIGS. 5-6 illustrate operation of the airbag module 68 associated with a seat 50 in the rear row 54. The scenario shown and described in FIGS. 5-6 can occur in response to sensing the occurrence of an event for which inflation of the primary airbag 70 is desired, such as a frontal vehicle collision. When this occurs, the controller 80 provides signals to the inflators 74, 78 in the airbag module 68 associated with the rear row 54 such that the airbags 70, 76 inflate and deploy into the cabin 40 on opposite forward-rearward sides of the seat 50 in the rear row. The airbags 70, 76, while inflated, cooperate to help protect the vehicle occupant 60 in the rear row 54 by absorbing the impact of the occupant.

The lower end 84 of the primary airbag 70 is positioned adjacent an occupant 60 in the rear row 54 aligned with and forward of the seat 50. The lower end 84 can engage the lap or lower torso of the occupant 60 (as shown) or be spaced therefrom (not shown). The lower end 112 of the support airbag 76 extends into the cabin 40 to a position rearward of the seatback 51 and spaced therefrom.

Due to the position of the airbags 70, 76 on opposite forward-rearward sides of the seat 50 and the tethers 120 connecting the airbags (on opposing inboard-outboard sides of the occupant 60), the seatback 51 acts as a reaction surface to the deployed primary airbag. The example configuration shown in FIG. 5-6 therefore requires no interaction with forward structure of the vehicle 20, such as an instrument panel or steering wheel to provide a reaction surface for the primary airbag 70 in the event of a frontal vehicle crash.

Because the occupant 60 is belted, a frontal crash resulting in forward occupant movement causes the occupant to bend at the waist and follow an angled or arcuate path toward the primary airbag 70, as indicated generally by the arrow $F_2$ in FIG. 5. Once the moving occupant 60 engages the primary airbag 70 (FIG. 6), the primary airbag is urged to move in the direction $F_2$.

Since the tethers 120 connect the support airbag 76 to the primary airbag 70, the moving primary airbag tensions the tethers and ultimately causes movement of the connected support airbag in the direction $F_2$. The support airbag 76 is pulled by the moving primary airbag 70 into engagement with the seatback 51, which prevents further movement of the support airbag in the direction $F_1$. This, in turn, prevents the primary airbag 70 from moving further in the direction $F_2$. In other words, the support airbag 76, through engagement with the seatback 51 and connection to the primary airbag 70 through the tethers 120, restricts movement of the primary airbag 70 away from the occupant 60.

As a result, the occupant 60 in a frontal crash is permitted to ride down the primary airbag 70 and experience a more gradual reaction with the airbag while the support airbag 76, through the seatback 51 and tethers 120, provides a reaction surface for the deployed, moving primary airbag. In other words, this configuration advantageously allows for a gradual slowdown of the penetrating occupant 60 into the primary airbag 70 in a prescribed manner.

It will be appreciated that the length of the tethers 120 and/or the placement of the airbags 70, 76 behind the roof liner 72 relative to the seat 50 can be selected to achieve a desired interaction between the occupant 60, the airbags, and the seat in both the frontal and rear vehicle crash scenarios. In particular, the placement of the primary airbag 70 in the forward-rearward vehicle direction can be selected such that the occupant 60 is spaced a predetermined distance from the inflated and deployed primary airbag prior to moving in the direction $F_1$ or $F_2$. Similarly, the placement of the support airbag 76 in the forward-rearward direction can be selected such that the seatback 51 is spaced a predetermined distance from the inflated and deployed support airbag 76 prior to the support airbag being pulled by the tethers 120 in the direction $F_1$ or $F_2$.

The length of the tethers 120 can be selected to provide a desired degree of slack therein (or lack thereof) when the airbags 70, 76 are deployed but prior to occupant 60 penetration into the primary airbag. Furthermore, the location of the tethers 120 along the height of the airbags 70, 76 can be selected to tailor how the penetrating occupant 60 interacts with the primary airbag (e.g., positioning the lowest tether further from the lower ends 84, 112 would allow the lower end of the primary airbag to fold or bend more relative to the fixed upper end 82). These considerations, taken alone or in combination, enable the occupant restraint system 10 to provide for a desired degree of occupant 60 movement in the direction $F_1$ or $F_2$ before penetrating the primary airbag 70, a desired degree of movement by the support airbag 76 before engaging the seatback 51, and tailored ride down characteristics once the support airbag limits movement of the primary airbag.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A restraint system for helping to protect an occupant of a vehicle having a roof and a cabin with a seat for the occupant, comprising:
  a primary airbag having a stored condition within the roof and being inflatable to a deployed condition extending into the cabin on a first side of the seat, wherein an inflatable volume of the primary airbag has a width in an inboard-outboard direction of the vehicle spanning a width of the seat;
  a support airbag having a stored condition within the roof and being inflatable to a deployed condition on a second side of the seat opposite the first side; and
  tethers connecting the primary airbag and the support airbag such that occupant penetration into the primary airbag pulls the support airbag into engagement with the seat, each tether extending from a first end connected to the primary airbag to a second end connected to the support airbag and wherein each tether is unsupported between the first and second ends.

2. The restraint system recited in claim 1, wherein the first side is rearward of the seat and the second side is forward of the seat.

3. The restraint system recited in claim 1, wherein the first side is forward of the seat and the second side is rearward of the seat.

4. The restraint system recited in claim 1, wherein the support airbag engages the seat to restrict movement of the primary airbag away from the occupant in response to occupant penetration into the primary airbag.

5. The restraint system recited in claim 1, wherein the primary airbag is configured to engage a lap of the occupant when in the deployed condition.

6. The restraint system recited in claim 1, wherein the primary airbag and the support airbag are provided in a single airbag module.

7. The restraint system recited in claim 1 further comprising:
  a first inflator for providing inflation fluid to the primary airbag; and
  a second inflator fluidly isolated from the first inflator for providing inflation fluid to the support airbag.

8. The restraint system recited in claim 1, wherein the support airbag is pulled into engagement with a seatback of the seat in response to occupant penetration into the primary airbag.

9. The restraint system recited in claim 1, wherein an inflatable volume of the support airbag has a width in the inboard-outboard direction of the vehicle spanning the width of the seat.

10. A restraint system for helping to protect an occupant of a vehicle having a roof and a cabin with a seat for the occupant, comprising:
  a primary airbag having a stored condition within the roof and being inflatable to a deployed condition extending into the cabin on a first side of the seat, wherein the first side is forward of the seat and the primary airbag is configured to be spaced from a lap of the occupant when in the deployed condition, and wherein an inflatable volume of the primary airbag has a width in an inboard-outboard direction of the vehicle spanning a width of the seat;

a support airbag having a stored condition within the roof and being inflatable to a deployed condition on a second side of the seat opposite the first side; and tethers connecting the primary airbag and the support airbag such that occupant penetration into the primary airbag pulls the support airbag into engagement with the seat.

11. A restraint system for helping to protect an occupant of a vehicle having a roof and a cabin with a seat for the occupant, comprising:

a primary airbag having a stored condition within the roof and being inflatable to a deployed condition extending into the cabin on a first side of the seat;

a support airbag having a stored condition within the roof and being inflatable to a deployed condition on a second side of the seat opposite the first side;

a first inflator for providing inflation fluid to the primary airbag;

a second inflator fluidly isolated from the first inflator for providing inflation fluid to the support airbag; and tethers connecting the primary airbag and the support airbag such that occupant penetration into the primary airbag pulls the support airbag into engagement with a seatback of the seat to restrict movement of the primary airbag away from the occupant.

12. The restraint system recited in claim 11, wherein the first side is rearward of the seat and the second side is forward of the seat.

13. The restraint system recited in claim 11, wherein the first side is forward of the seat and the second side is rearward of the seat.

14. The restraint system recited in claim 11, wherein the primary airbag is configured to engage a lap of the occupant when in the deployed condition.

15. The restraint system recited in claim 11, wherein the first side is forward of the seat and the primary airbag is configured to be spaced from a lap of the occupant when in the deployed condition.

16. The restraint system recited in claim 11, wherein the primary airbag and the support airbag are provided in a single airbag module.

17. The restraint system recited in claim 11, wherein an inflatable volume of the primary airbag has a width in an inboard-outboard direction of the vehicle spanning a width of the seat.

18. The restraint system recited in claim 11, wherein an inflatable volume of the support airbag has a width in an inboard-outboard direction of the vehicle spanning a width of the seat.

19. The restraint system recited in claim 11, wherein each tether extends from a first end connected to the primary airbag to a second end connected to the support airbag and wherein each tether is unsupported between the first and second ends.

* * * * *